(12) United States Patent
Chen et al.

(10) Patent No.: US 9,208,566 B2
(45) Date of Patent: Dec. 8, 2015

(54) SPECKLE SENSING FOR MOTION TRACKING

(71) Applicants: Nicholas Yen-Cherng Chen, Cambridge (GB); Stephen Edward Hodges, Cambridge (GB); Andrew William Fitzgibbon, Cambridge (GB); Andrew Clark Goris, Loveland, CO (US); Brian Lee Hastings, Larimer County, CO (US); Shahram Izadi, Cambridge (GB)

(72) Inventors: Nicholas Yen-Cherng Chen, Cambridge (GB); Stephen Edward Hodges, Cambridge (GB); Andrew William Fitzgibbon, Cambridge (GB); Andrew Clark Goris, Loveland, CO (US); Brian Lee Hastings, Larimer County, CO (US); Shahram Izadi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/963,117

(22) Filed: Aug. 9, 2013

(65) Prior Publication Data
US 2015/0043770 A1    Feb. 12, 2015

(51) Int. Cl.
*G06K 9/00* (2006.01)
*G06T 7/00* (2006.01)
*G06F 3/01* (2006.01)
(Continued)

(52) U.S. Cl.
CPC .............. *G06T 7/0042* (2013.01); *G06F 3/011* (2013.01); *G06F 3/0304* (2013.01); *G06F 3/0346* (2013.01); *G06K 9/00208* (2013.01)

(58) Field of Classification Search
CPC ........... G06T 2207/10028; G06T 2207/10012; G06T 7/0075; G06T 2207/10021; G06T 7/005; G06K 9/00201
USPC .......................................... 382/104, 106, 154
See application file for complete search history.

(56) References Cited

U.S. PATENT DOCUMENTS 5,887,069 A * 3/1999 Sakou et al. .................. 382/100
6,151,015 A   11/2000 Badyal et al.
7,161,582 B2  1/2007 Bathiche et al.
(Continued)

FOREIGN PATENT DOCUMENTS

WO   2006128093 A2   11/2006
WO   2007105215 A2   9/2007
WO   2012091807 A2   7/2012

OTHER PUBLICATIONS

Olwal, et al., "SpeckleEye: Gestural Interaction for Embedded Electronics in Ubiquitous Computing", In Proceedings of the ACM Annual Conference on Extended Abstracts on Human Factors in Computing Systems, May 5, 2012, 6 pages.
(Continued)

*Primary Examiner* — Alex Liew
(74) *Attorney, Agent, or Firm* — Steve Wight; Judy Yee; Micky Minhas

(57) ABSTRACT

Speckle sensing for motion tracking is described, for example, to track a user's finger or head in an environment to control a graphical user interface, to track a hand-held device, to track digits of a hand for gesture-based control, and to track 3D motion of other objects or parts of objects in a real-world environment. In various examples a stream of images of a speckle pattern from at least one coherent light source illuminating the object, or which is generated by a light source at the object to be tracked, is used to compute an estimate of 3D position of the object. In various examples the estimate is transformed using information about position and/or orientation of the object from another source. In various examples the other source is a time of flight system, a structured light system, a stereo system, a sensor at the object, or other sources.

20 Claims, 11 Drawing Sheets

(51) Int. Cl.
  *G06F 3/03* (2006.01)
  *G06F 3/0346* (2013.01)

(56) References Cited

U.S. PATENT DOCUMENTS

| | | |
|---|---|---|
| 7,292,232 B2 | 11/2007 | Ranta et al. |
| 7,505,033 B2 | 3/2009 | Guo et al. |
| 7,715,016 B2 | 5/2010 | Hwang et al. |
| 7,737,948 B2 | 6/2010 | Spurlock et al. |
| 8,390,821 B2 | 3/2013 | Shpunt et al. |
| 2004/0005092 A1* | 1/2004 | Tomasi ......................... 382/154 |
| 2009/0237356 A1 | 9/2009 | Williams et al. |
| 2010/0046802 A1* | 2/2010 | Watanabe et al. ............. 382/106 |
| 2010/0234094 A1* | 9/2010 | Gagner et al. .................. 463/20 |
| 2012/0182392 A1 | 7/2012 | Kearns et al. |
| 2012/0309532 A1* | 12/2012 | Ambrus et al. ................. 463/36 |

OTHER PUBLICATIONS

Francis, et al., "Objective Speckle Velocimetry for Autonomous Vehicle Odometry", In Journal of Applied Optics, vol. 51, Issue 16, Jun. 2012, 13 pages.

Zizka, et al., "SpeckleSense: Fast, Precise, Low-Cost and Compact Motion Sensing Using Laser Speckle", In Proceedings of the 24th Annual ACM Symposium on User Interface Software and Technology, Oct. 16, 2011, 10 pages.

Dunmeyer., "Laser Speckle Modeling for Three-Dimensional Metrology and LADAR",M. Eng. dissertation Massachusetts Institute of Technology, Jan. 1, 2001.

"International Search Report and Written Opinion issued for International Application No. PCT/US2014/049841", Mailed Date: Nov. 21, 2014,12 pages.

"Second Written Opinion Issued in PCT Application No. PCT/US2014/049841", Mailed Date: Jul. 2, 2015, 7 pages.

\* cited by examiner

SPECKLE SENSING FOR MOTION TRACKING

BACKGROUND

A speckle pattern is a micro-pattern of illumination generated by a coherent light source, such as a laser, when it passes through a diffuser or when it scatters from a surface which has irregularities larger than the wavelength of the illumination. Streams of laser speckle images are used in some types of computer mice to calculate 2D velocity vectors tracking motion of the mouse. Disparities between corresponding speckles in images of the same speckle pattern taken at different times give information about 2D displacement.

For many applications, such as robotics, vehicle navigation, computer game applications, medical applications and other problem domains, it is valuable to be able to track motion comprising 3D position (and optionally also orientation) of a device as it moves in a known environment. Orientation and position of a device is known as pose and may comprise six degrees of freedom (three of translation and three of rotation).

Existing approaches for tracking 3D position of an object in an environment, such as time of flight camera systems, structured light camera systems, fiducial marker systems, global positioning systems and others are often best suited for coarse levels of detail. Existing equipment for fast and/or fine-grained tracking of objects requires considerable fixed infrastructure and is typically cost-prohibitive for most consumers.

The embodiments described below are not limited to implementations which solve any or all of the disadvantages of known motion tracking systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Speckle sensing for motion tracking is described, for example, to track a user's finger or head in an environment to control a graphical user interface, to track a hand-held device, to track digits of a hand for gesture-based control, and to track 3D motion of other objects or parts of objects in a real-world environment. In various examples a stream of images of a speckle pattern from at least one coherent light source illuminating the object, or which is generated by a light source at the object to be tracked, is used to compute an estimate of 3D position of the object. In various examples the estimate is transformed using information about position and/or orientation of the object from another source. In various examples the other source is a time of flight system, a structured light system, a stereo system, a sensor at the object, or other sources.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a text input system, the system described is provided as an example and not a limitation. As those skilled in the art will appreciate, the present examples are suitable for application in a variety of different types of systems using high speed and/or fine grained 3D motion tracking.

Figure 1:
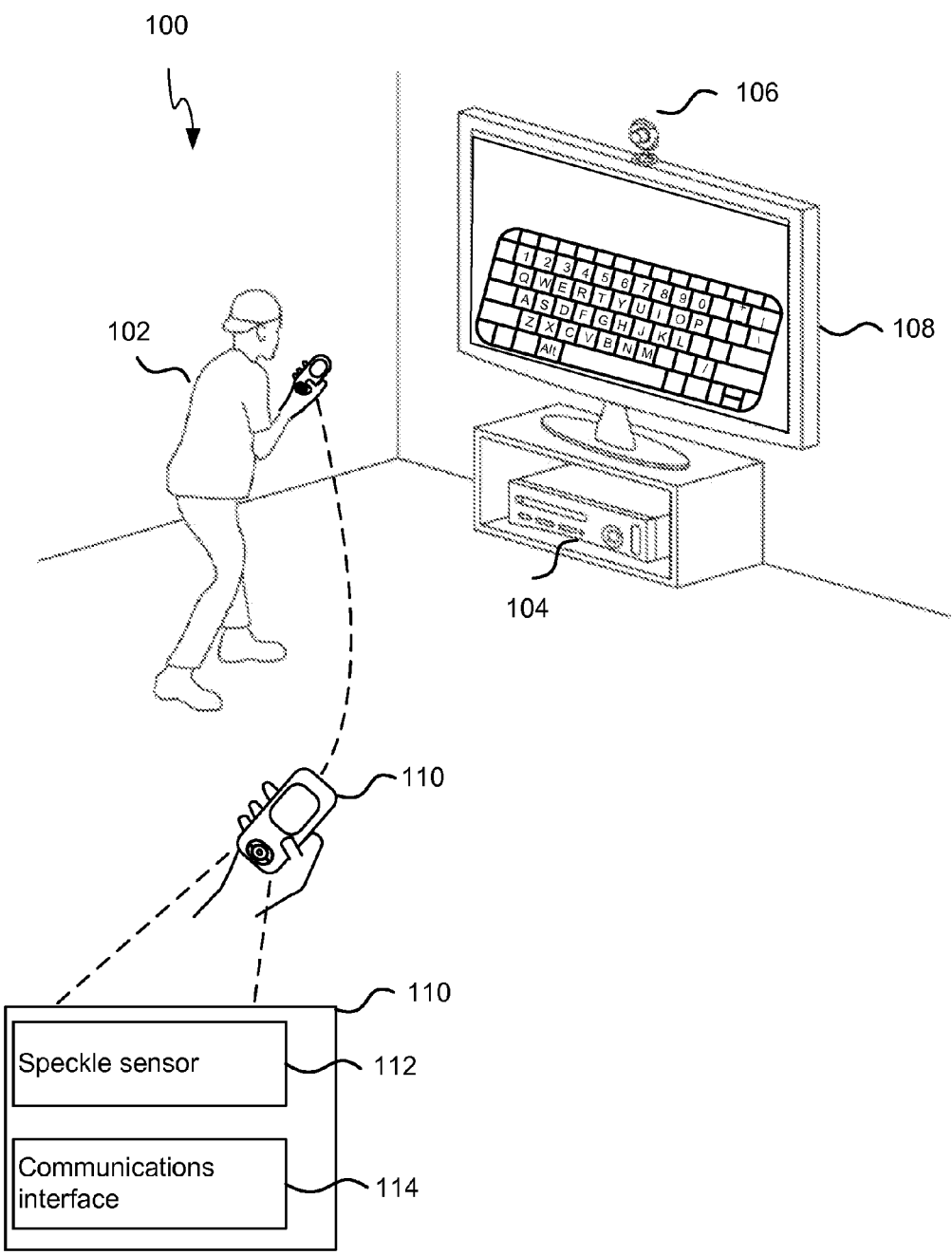
FIG. 1 is a schematic diagram of a motion tracking system using laser speckle where a speckle sensor is incorporated in a hand-held device.

FIG. 1 is a schematic diagram of a motion tracking system using laser speckle where at least one speckle sensor 112 is incorporated in a hand-held device 110 such as a smart phone, game controller, 3D mouse or other hand-held device. The hand-held device comprises a communication interface 114 such as a wireless interface for communicating with computing device 104. Note that FIG. 1 shows only two components of the hand-held device for clarity. In this example, the user points the device at a display screen 108 which displays a keyboard display. The user is able to select characters on the keyboard by orienting the hand-held device in order to enter text.

For example, a laser projector integral with an image capture device 106 located on display screen 108 projects a laser speckle micro-pattern into the environment. The laser projector may have a diffuser in order to create the laser speckle pattern.

At the hand-held device 110, at least one speckle sensor 112 captures a stream of images of the laser speckle pattern as the hand-held device 110 moves in the environment. The stream of speckle images may be used to compute 2D translation vectors which supply constraints on motion of the hand-held device. In some examples, where secondary statistics of the speckle patterns are computed such as speckle size, the stream of speckle images may be used to provide more precise constraints on 3D motion. The computed motion constraints may be combined with other sources of position and/or orientation information to enable accurate, fine-grained, fast, tracking of 3D motion of the hand-held device. In some examples the 3D motion comprises a series of 6 degree of freedom poses of the hand-held device. In some examples the 3D motion comprises a series of x, y, z coordinate triples. In some examples the 3D motion is relative 3D motion and in some examples the 3D motion is absolute 3D motion.

Many different types of other source of position and/or orientation information may be used and these are described in more detail later with reference to FIG. 3. In the example of FIG. 1 the other source is a structured light depth sensing system.

In this example of FIG. 1 the computing device 104 controls a structured light depth sensing system which operates to compute depth maps of objects in the environment (in this case, a room in which a person 102 is entering text at display screen 108). The structured light depth sensing system comprises a laser projector and an image capture device 106 located above the display screen 108 and which are controlled by computing device 104. The laser projector projects a structured light pattern into the room and the image capture device 106 captures a stream of images of the environment illuminated by the structured light pattern and ambient illumination. Structured light systems are typically engineered so that the light pattern is the same, up to a 2D homography, on all z=const planes where the z axis is the camera's principal ray. In contrast, for speckle, the pattern changes depending on the location of the plane (i.e., as const increases or decreases). For example, structured light systems are typically engineered so that the light pattern will look substantially the same regardless of how far away from the emitter one is. In contrast, for speckle systems, significant changes in the pattern occur with distance from the emitter because of the limited length of speckle lobes.

Using the stream of images the computing device 104 and/or the image capture device compute depth maps of the environment. A depth map is an image where each image element comprises a numerical distance value which is a measure of the distance from the image capture device to a surface point in the environment depicted by that image element. The streams of depth maps may be used to compute body parts of the person 102 and to detect gestures made by the person 102. However, tracking fine-grained movements and gestures using the structured light system may be challenging especially at high speeds. In particular, measures of the 3D orientation of objects are typically very inaccurate. The smaller the object the worse that is. This is due to limitations in image capture device resolution and speed, due to noise and other factors. By combining the depth map information from the structured light system with the motion constraints from the speckle sensing system the resulting motion capture data is significantly better than either system can provide on its own.

As mentioned above, laser speckle is a pattern of illumination generated by a coherent light source, such as a laser, when it passes through a diffuser or when it scatters from a surface which has irregularities larger than the wavelength of the illumination. The scattered coherent light interferes to produce speckle lobes 200 illustrated in FIG. 2.

In the case of movement between a speckle emitter and a speckle sensor which is along an axis of the speckle lobes it is difficult for the speckle sensor to detect the motion because the constraints on 3D motion become weaker. For example, a static speckle emitter in FIG. 2 produces speckle lobes 200 and an image sensor moves along an axis of the speckle lobes from position 204 to position 202. The corresponding captured speckle images are illustrated schematically in FIG. 2 and they are almost identical. This means that the speckle sensor is unable to distinguish between zero motion or motion in the Z direction. This is especially problematic at high frame rates.

Figure 2:
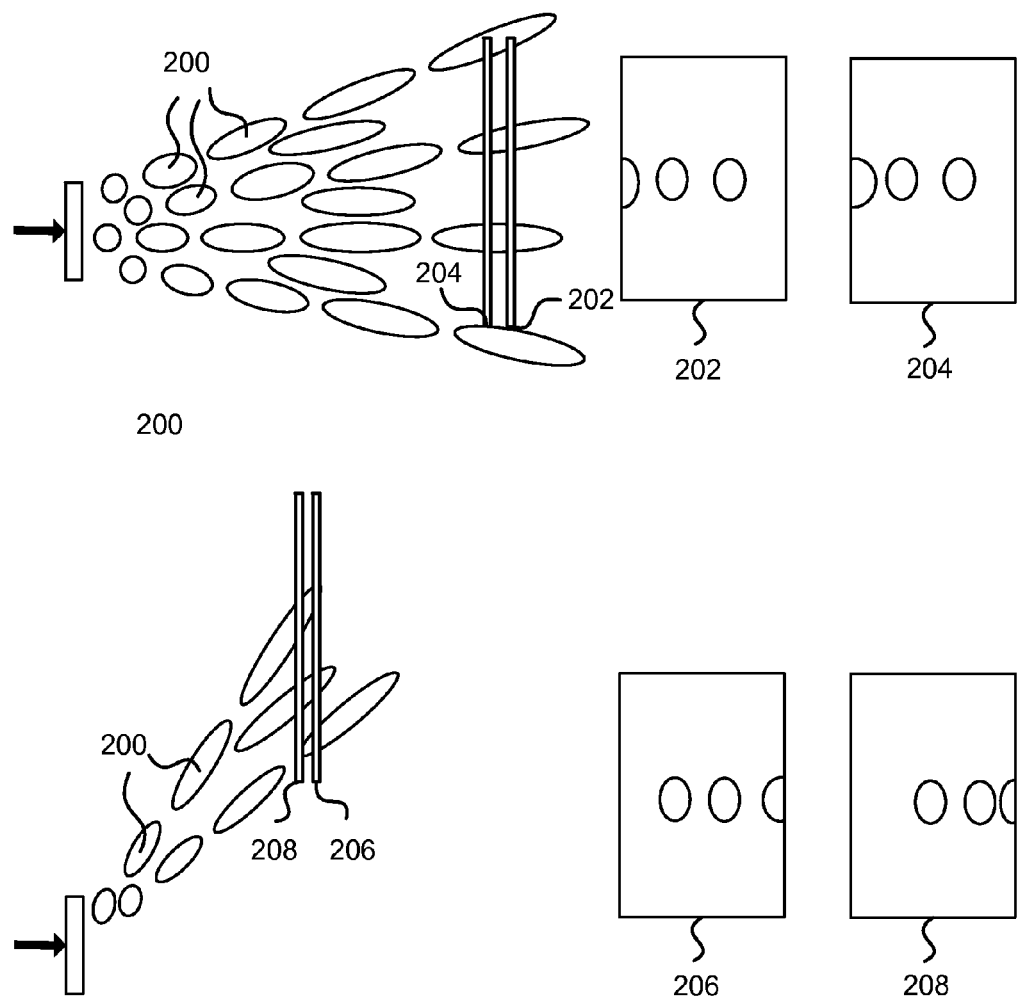
FIG. 2 is a schematic diagram of a laser speckle projection in the case that an image sensor moves along an axis of the speckle lobes and in the case that an image sensor moves off-axis of the speckle lobes.

In the case of movement between a speckle emitter and a speckle sensor which is off-axis of the speckle lobes and which is normal to the speckle emitter, a speckle sensing system is likely to detect the wrong motion. For example, the lower half of FIG. 2 illustrates a static speckle emitter producing speckle lobes 200 and where a speckle sensor moves between positions 208 and 206 to produce images as illustrated schematically. The images show the speckle lobes shifting in position with a translation along the x axis which may be interpreted by the speckle sensor as a horizontal translation with respect to the speckle emitter rather than a depth translation.

To calculate a correct translation of the speckle sensor (where the speckle emitter is static) or of the speckle emitter (where the speckle sensor is static) additional information may be used. For example, secondary statistics of the speckle image may be used such as speckle size where speckle size is related to depth from the speckle emitter. Additional speckle sensors may be used at different locations. Additional speckle emitters may be used at different locations in the environment. Additional information may also come from sources outside the speckle system, such as a structured light system or other sources as described with reference to FIG. 3. Any combinations of one or more types of additional information may be used.

Figure 3:
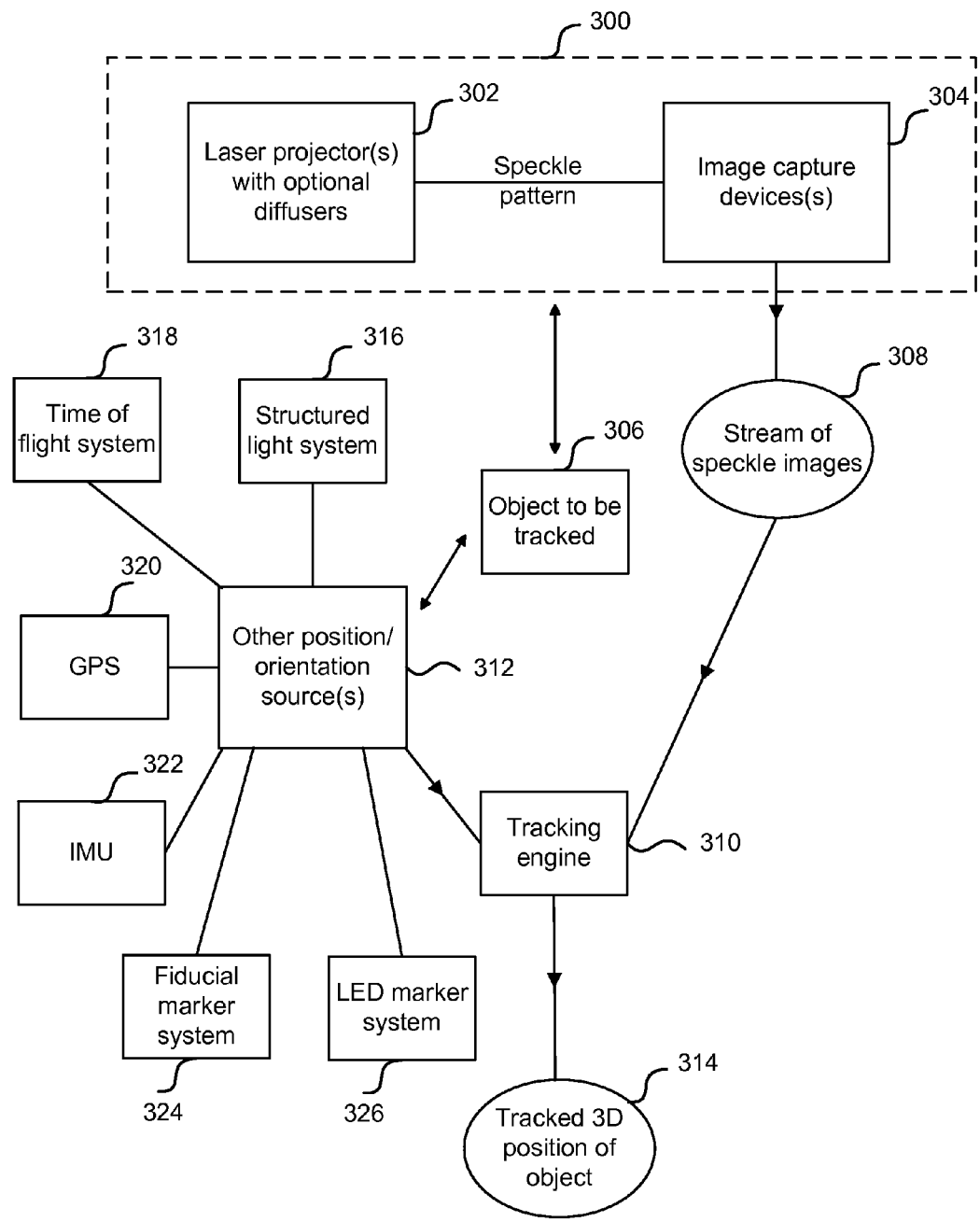
FIG. 3 is a schematic diagram of a tracking engine used with a laser speckle system and at least one other position/orientation source to track the 3D position of an object.

FIG. 3 is a schematic diagram of a tracking engine 310 used with a laser speckle system and at least one other position/orientation source to track the 3D position of an object. The word "object" is used herein to mean a whole object or part of an object. The tracking engine is computer-implemented using software and/or hardware. For example, the tracking engine may comprise one or more front-end correlation engines similar to those used in conventional computer mice. In some examples the tracking engine 310 is located, in whole or in part, at an image capture device having one or more speckle image sensors such as the hand-held device 110 of FIG. 1. In some examples the tracking engine 310 is located at a computing device in communication with one or more speckle image sensors. For example, computing device 104 of FIG. 1 or any other computing device. The tracking engine produces as output a tracked 3D position 314 of an object to be tracked 306. As mentioned above the tracked 3D position may be absolute or relative and may comprise a 6 degree of freedom pose or x,y,z coordinates. The object to be tracked 306 may be a speckle image sensor (where one or more speckle image sensors are on an object to be tracked) or may be an object moving in an environment such as a person, animal, or any other object in whole or in part.

The tracking engine functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPU)s.

The tracking engine 310 receives as input a stream of speckle images 308 and position and or orientation data from other sources 312. The stream of speckle images 308 is output from a speckle system 300 comprising at least one laser projector with an optional diffuser and at least one image capture device 304. At least one laser projector generates a speckle pattern either by using a diffuser over the laser projector or by reflecting or scattering the laser light from a surface. The object to be tracked 306 interacts with the speckle sensing system either because: the laser projector (with or without a diffuser) is located on the object to be tracked; or because the speckle pattern illuminates the object to be tracked. Using the interaction between the object to be tracked 306 and the speckle system 300 the stream of speckle images 308 contains information about motion of the object to be tracked 306.

In various examples the object to be tracked has at least some retroreflective material or retroreflective surfaces which enable speckle patterns to be generated even where low power coherent light sources are used.

In some examples the speckle system 300 comprises equipment from a conventional computer mouse such one or more speckle sensors. These are readily available, compact and cost effective and typically provide as output 2D velocity vectors. Adapted or modified computer mouse sensors may also be used.

Other types of image capture device 304 may also be used such as an IR video camera or other image capture device. The image capture device 304 may be lens-less to enable a large field of view, reduce signal loss and to reduce computational complexity during analysis of the speckle images. However, it is also possible to use image capture devices with lenses.

The laser projector 302 may be any suitable low cost, compact laser projector. Where a diffuser is used this may be any low cost diffuser which enables a speckle pattern to be generated.

The other sources of position and/or orientation data may be one or more of: a time of flight system 318, a structured light system 316, a global positioning system 320, an inertial measurement unit (IMU) 322, a compass, an accelerometer, a gyroscope, a fiducial marker system 324, a light emitting diode (LED) system 326, a stereo system, a magnetic field system, a motion capture system, a mechanical system, an ultrasound/acoustic system, a visual system or any other source of position and/or orientation data.

A time-of-flight system may comprise an infra-red (IR) time-of-flight camera, which emits IR light onto the scene. An image capture device is arranged to detect backscattered light from the surface of one or more objects in the scene. In some examples, pulsed infrared light may be emitted from the emitter such that the time between an outgoing light pulse and a corresponding incoming light pulse may be detected by the image capture device and used to determine a physical distance from the image capture device to a location on objects in the scene. Additionally, in some examples, the phase of the outgoing light wave from the emitter may be compared to the phase of the incoming light wave at the image capture device to determine a phase shift. The phase shift may then be used to determine a physical distance from the image capture device to a location on the objects by analyzing the intensity of the reflected beam of light over time via various techniques including, for example, shuttered light pulse imaging.

In a structured light system patterned light (e.g. light displayed as a pattern such as spots, a grid or stripe pattern, which may also be time-varying) may be projected onto a scene. Upon striking the surface of objects in the scene the pattern becomes deformed. Such a deformation of the pattern is captured by a camera and analyzed to determine an absolute or relative distance from the camera to the objects in the scene.

An inertial measurement unit (IMU) 322 may be incorporated in the hand-held device of FIG. 1 or in other apparatus comprising the speckle sensor(s) where the speckle sensors move in the environment. This may provide information about orientation of the speckle sensor(s). In examples where the speckle sensor(s) are static and the speckle emitter moves the IMU may be integral with apparatus holding the speckle emitter. For example, a moving speckle emitter is beneficial where low cost units with little or no onboard computing are used.

A GPS unit, gyroscope, compass, accelerometer or other orientation or movement sensor may be used at either the speckle sensor or the speckle emitter.

A fiducial marker system 324 is one using reference points in the environment. For example, an optically machine-readable label such as a 2D barcode, bokode or similar may be placed on an object and may provide information about the position and/or orientation of the object. An LED marker system 326 may use calibrated LEDs or retroreflective markers on the object to be tracked. An example of a fiducial marker system is one that looks at color, size, and position of a sphere in a captured image to determine 3-D position.

Figure 4:
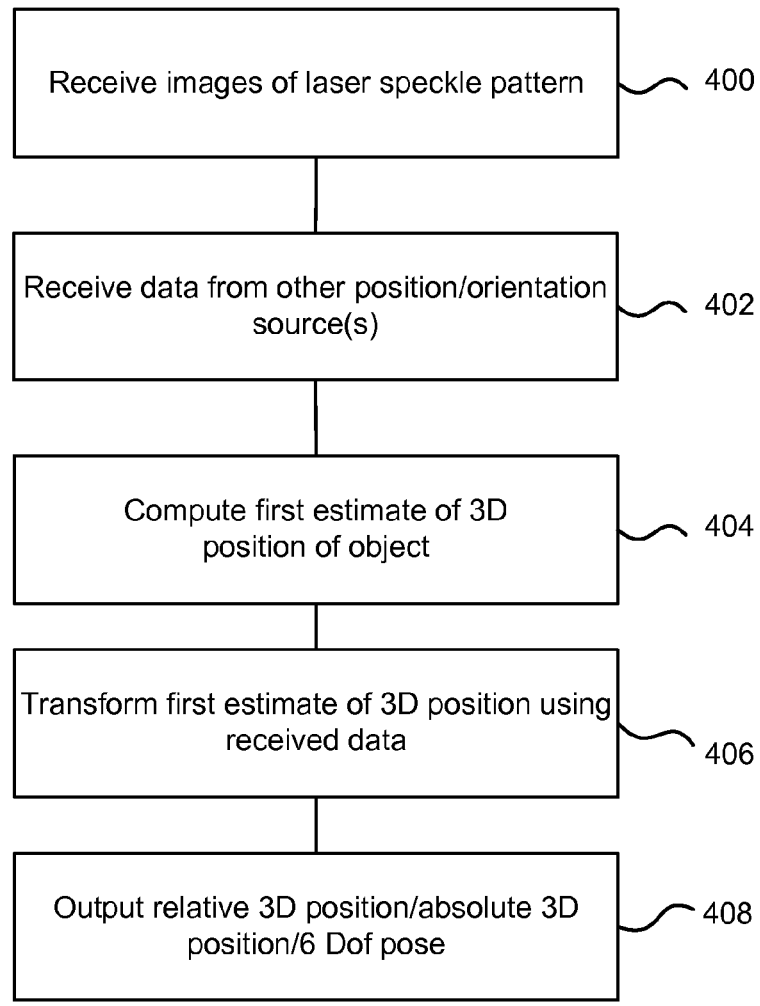
FIG. 4 is a flow diagram of a method at the tracking engine of FIG. 3.

FIG. 4 is a flow diagram of a method at the tracking engine of FIG. 3. The tracking engine receives 400 a plurality of images of a laser speckle pattern. Each image is associated with a speckle emitter-speckle receiver pair.

The tracking engine receives 402 data about orientation and position of the object to be tracked from one or more other sources as described above with reference to FIG. 3.

The tracking engine computes 404 a first estimate of 3D position of the object to be tracked using the received images of the laser speckle pattern. For example, the tracking engine may use 2D velocity vectors from a single speckle emitter-receiver pair together with secondary speckle statistics such as speckle size to compute a first estimate of 3D position. The first estimate of 3D position also implicitly constrains the orientation of the object being tracked.

In another example, the tracking engine may combine 2D velocity vectors from two emitter-receiver pairs optionally with secondary speckle statistics such as speckle size to compute a first estimate of 3D position. Where information is known about the emitter-receiver pairs from a calibration stage (such as the relative positions of two static emitters) it is possible to compute 3D velocity. Two emitter-receiver pairs may be provided by having two receivers and a single emitter or in other ways.

The tracking engine has received 402 data about orientation and position of the object to be tracked from one or more other sources as described above with reference to FIG. 3. The tracking engine is able to combine the received data and the first estimate of 3D position. The process of combining or fusing the received data and the first estimate of 3D position may be achieved in any computational order or simultaneously. For example, using speckle to compute a first estimate and then refining that using data from other sources; or obtaining a first estimate from other sources and refining that using the speckle images.

For example, using the received data the tracking engine transforms 406 the first estimate of 3D position for example, by scaling and calibrating. In an example the transformation calculation converts the first estimate of 3D position into world coordinates.

The tracking engine outputs 410 the transformed 3D position as any one or more of a relative 3D position, an absolute 3D position, a 6 degree of freedom pose.

Figure 5:
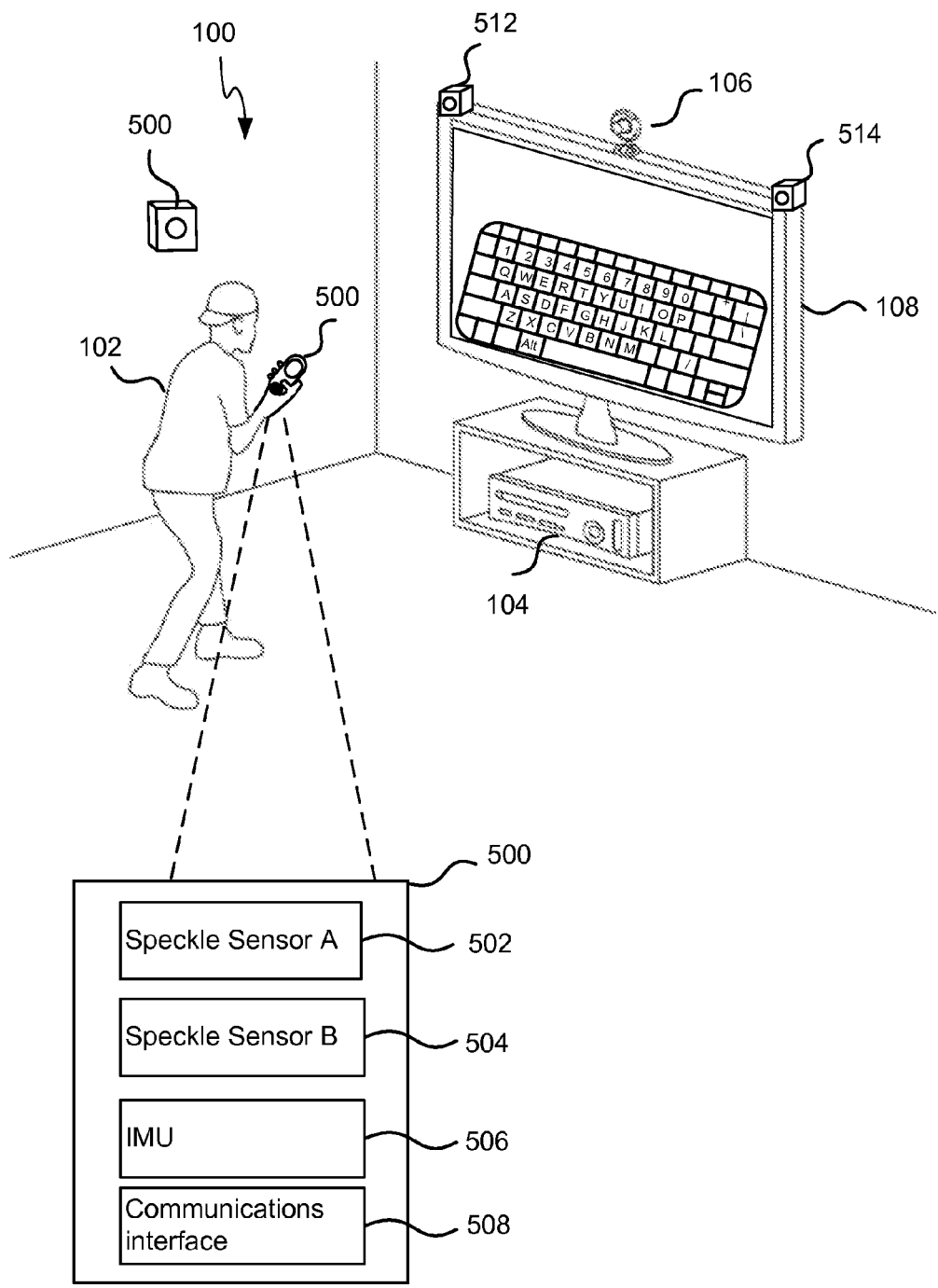
FIG. 5 is a schematic diagram of a motion tracking system using laser speckle where a plurality of speckle sensors and/or a plurality of laser projectors are used.

FIG. 5 is a schematic diagram of a motion tracking system using laser speckle where a plurality of speckle sensors and/or a plurality of laser projectors are used. In this example a plurality of emitter-receiver pairs are used and this gives the speckle system more information to enable it to calculate 3D position more accurately especially in the situations discussed with reference to FIG. 2. It may also enable the tracking engine to exclude the use of secondary speckle statistics which have been found to be unreliable in some situations.

For example, the hand-held device 500 may comprise two speckle sensors 502, 504 as well as an optional IMU 506 and a communications interface 508. The speckle sensors 502, 504 may be at different positions and orientations and may receive speckle projected from a single projector. By using a plurality of speckle sensors at different locations, ambiguity in the speckle images, as discussed above with reference to FIG. 2, may be mitigated.

It is also possible for one or more additional speckle emitters 510, 512, 514 to be positioned in the room at different locations (which may be known from a calibration stage). By using additional speckle emitters at different locations, ambiguity in the speckle images, as discussed above with reference to FIG. 2, may be mitigated.

Illumination from the speckle emitters may be multiplexed using time or frequency. Multiplexing in this way enables interference between emitter/receiver pairs to be mitigated and enables a single receiver to be used with multiple emitters.

Figure 6:
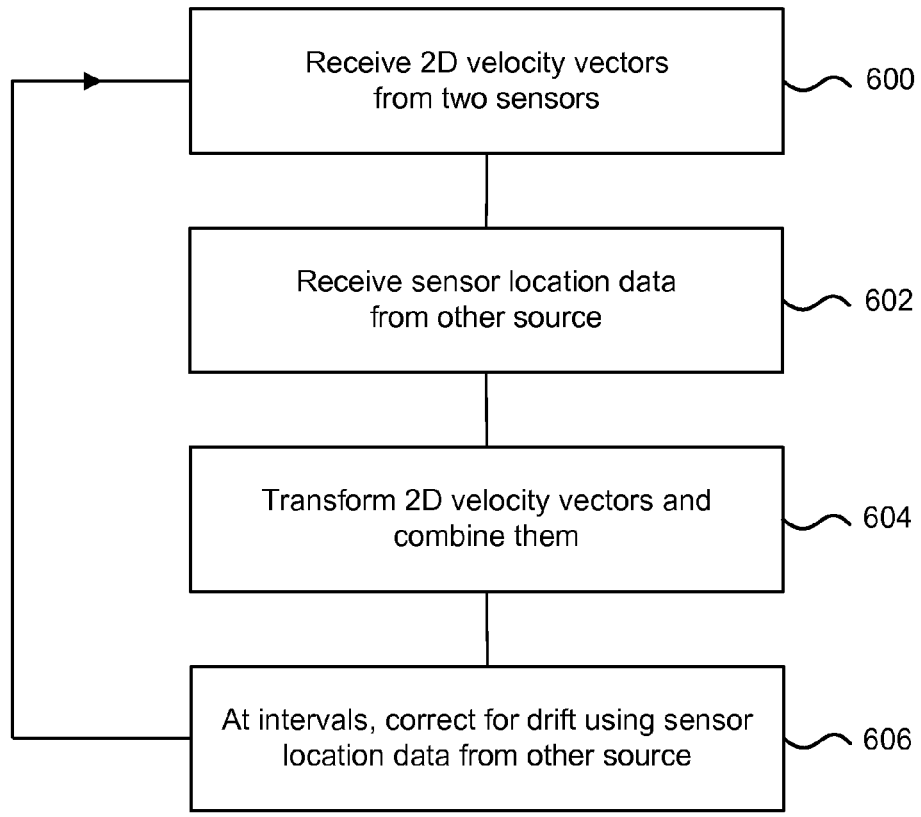
FIG. 6 is a flow diagram of a method at the tracking engine of FIG. 3 where a plurality of speckle sensors are used.

With reference to FIG. 6, where a plurality of speckle emitter-receiver pairs are used, the tracking engine receives 600 2D velocity vectors associated with each emitter-receiver pair. It receives 602 position and/or orientation data from at least one other source. It transforms 604 the 2D velocity vectors using the received data so that the 2D velocity vectors are in world coordinates and combines them, using aggregation such as summation, averaging, weighted averaging, non-linear optimization, or other combination method. At intervals the tracking engine corrects 606 for drift by combining the 3D position estimates it generates with sensor location data received from the other source(s). For example, using a Kalman filter or a proportional integration feedback controller.

Figure 7:
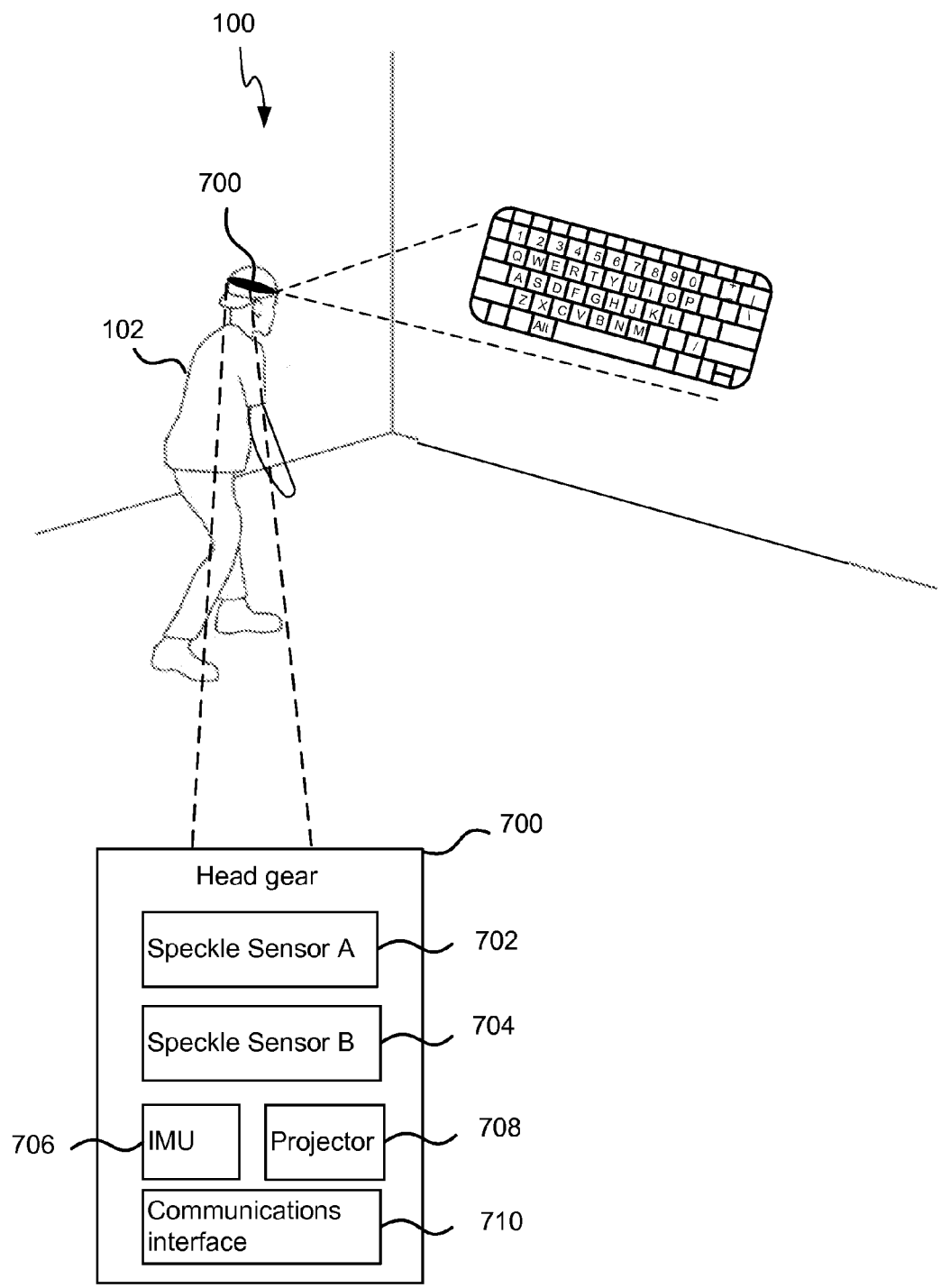
FIG. 7 is a schematic diagram of a motion tracking system using a head-mounted device.

FIG. 7 is a schematic diagram of a motion tracking system using a head-mounted display device 700 such as a head band or apparatus integral with a hat. In this example, a user 102 is able to move his or her head in order to select characters and input text at a display projected by the head-mounted apparatus. The head-mounted device 700 may comprise one or more speckle sensors 702, 704. In this example two speckle sensors 702, 704 are used and these are separated physically in the head-mounted device 700. Greater physical separation between the two speckle sensors is possible than in the example of FIG. 5 where the two speckle sensors are integral with a hand-held device. This enables the speckle system to obtain speckle images which potentially give more information about motion in situations where a single speckle emitter is used. The head-mounted device 700 may comprise an IMU 706, a projector 708 and a communications interface 710. For example the projector may project images from a game system into the environment according to the user's head position and orientation.

Figure 8:
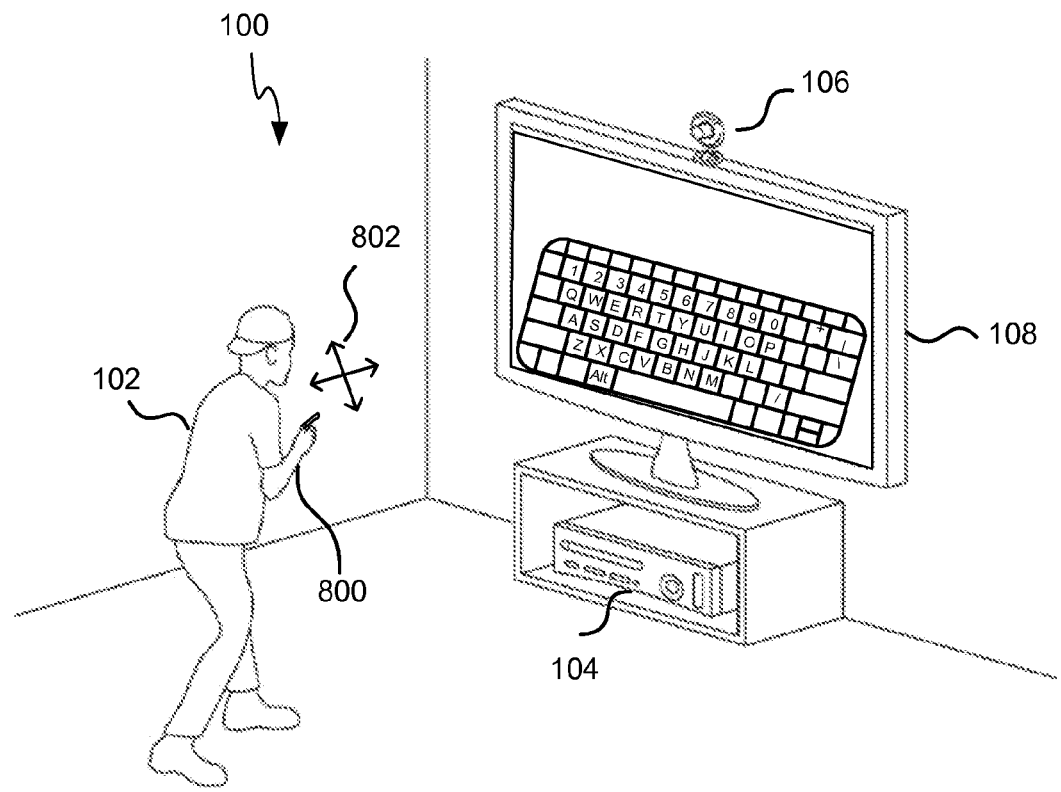
FIG. 8 is a schematic diagram of a motion tracking system using a static speckle sensor and a static speckle source.

FIG. 8 is a schematic diagram of a motion tracking system using a static speckle sensor and a static, coherent, non-diffuse, light source (integrated in device 106 in this example). In this example, the coherent illumination falls on the person 102 in addition to any other structured light pattern emitted by device 106. As the coherent light scatters from the person, diffraction and interference between the scattered rays, produces a speckle pattern. A speckle receiver at device 106 detects the speckle pattern and computes the 3-D position of the person 102 from disparities in the speckle pattern between subsequent speckle images. For example, the tracking engine in this example computes the 3D pose of the person's finger and that data is used to enable selection of characters to input text. In some examples, the tracking engine uses other structured light emitted by device 106 as the other source of data on position and/or orientation. This is explained with reference to FIG. 10. In the example of FIG. 8 the person may wear clothing made from retroreflective material so that the system is operable even for low power light sources. However, this is not essential.

In an example 3D position of an object in a real-world environment is tracked by receiving, from at least one image capture device, a plurality of images of the object illuminated by both at least one speckle pattern and a structured light pattern. For example the configuration of FIG. 8 may be used. A tracking engine may compute a first estimate of 3D position of the object on the basis of speckle information in the plurality of images. The tracking engine (or another entity) may compute a second estimate of 3D position of the object on the basis of structured light in the plurality of images. The tracking engine is able to combine the first and second estimates of 3D position of the object to give a more accurate, fine-grained 3D position which is computed in a fast efficient manner. In some examples the first estimate of 3D position is computed more frequently than the second estimate of 3D position which may be computed at intervals set according to the particular application involved and the computing resources available. For example, both systems may be computing on a per-frame basis where the frame rate for the speckle system is significantly higher than that for the structured light system.

Figure 9:
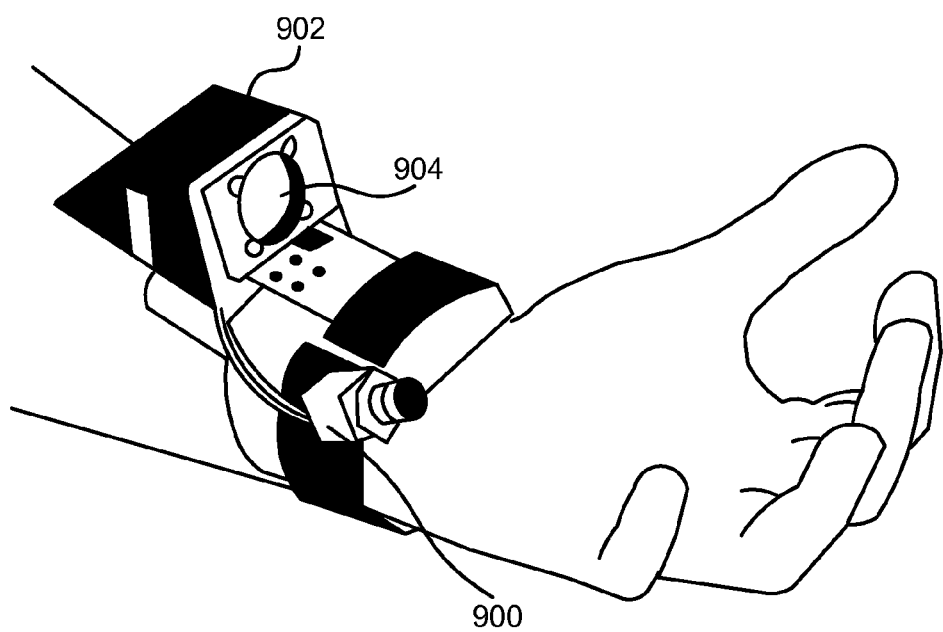
FIG. 9 is a schematic diagram of a motion tracking system using a mobile speckle sensor and a mobile speckle source.

FIG. 9 is a schematic diagram of a speckle system comprising a mobile speckle sensor 904 and a mobile speckle source 900 which are both worn on a user's wrist. The wrist worn device may also comprise an IMU 902, a communications interface, and a power source. In this example, the speckle source is a laser projector which illuminates a user's digits with laser illumination comprising a speckle pattern (or generating a speckle pattern by scattering from the digits). The speckle sensor comprises an IR camera which captures a stream of images of the user's digits illuminated by the speckle pattern. In the case that a speckle pattern is projected onto the digits then the camera on the wrist comprises a lens to bring the speckle pattern on the digits into focus. Otherwise the camera may be lens-less. The speckle images are used to compute 3D position of the digits to enable gesture recognition or for other purposes. In this example one speckle emitter-receiver pair is shown but it is also possible to use a plurality of speckle emitter-receiver pairs.

Figure 10:
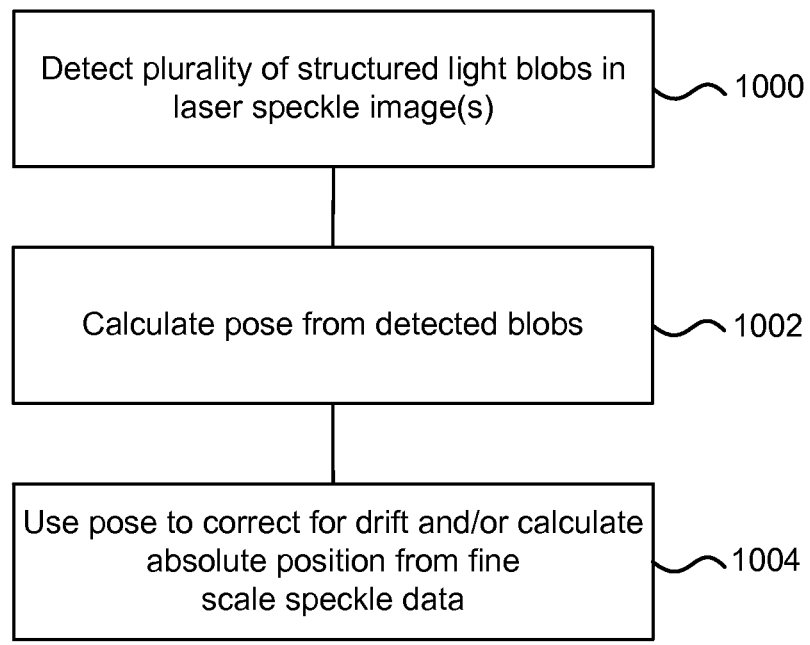
FIG. 10 is a flow diagram of a method of using structured light in combination with laser speckle.

As mentioned with reference to FIG. 10 a laser projector emitting both speckle and a structured light pattern may be used. In this case, the tracking engine may detect 1000 a plurality of structured light blobs in the laser speckle images by applying a filter to the images or in other ways. Once a specified number of structured light blobs are detected and their relative 2D positions calculated, the tracking engine is able to calculate 1002 position and/or orientation information of the depicted surface (i.e. a surface of the object to be tracked) in a manner used by the structured light system associated with the laser projector. This position and/or orientation information may be used to correct 1004 for drift and/or to refine position data obtained from the speckle system.

Figure 11:
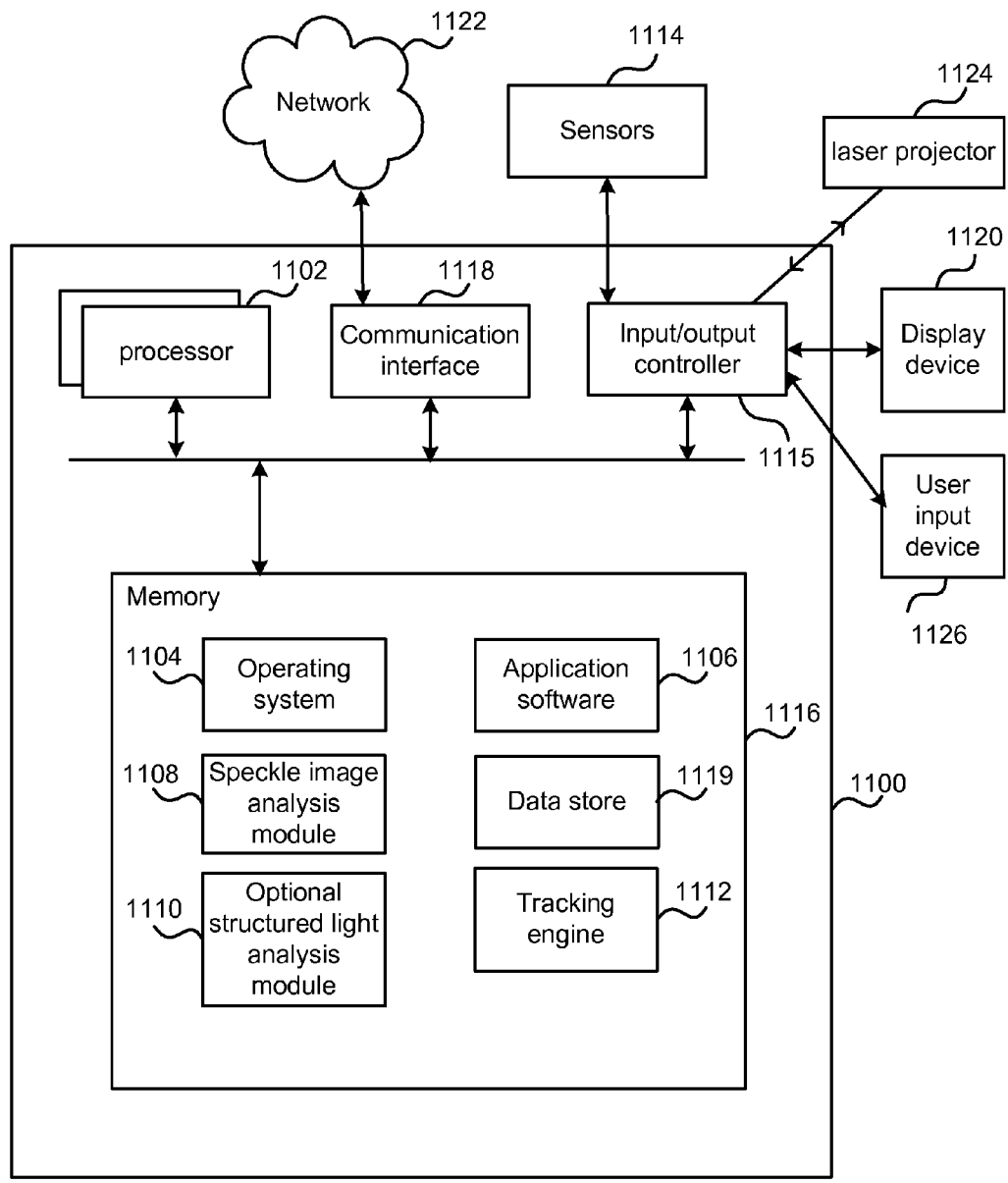
FIG. 11 illustrates an exemplary computing-based device in which embodiments of a tracking engine may be implemented.

FIG. 11 illustrates various components of an exemplary computing-based device 1100 which may be implemented as any form of a computing and/or electronic device, and in which embodiments of a tracking engine may be implemented.

Computing-based device 1100 comprises one or more processors 1102 which may be microprocessors, controllers or any other suitable type of processors for processing computer executable instructions to control the operation of the device in order to track 3D motion of an object or part of an object. In some examples, for example where a system on a chip architecture is used, the processors 1102 may include one or more fixed function blocks (also referred to as accelerators) which implement a part of the method of tracking 3D motion in hardware (rather than software or firmware). Platform software comprising an operating system 1104 or any other suitable platform software may be provided at the computing-based device to enable optional application software 1106 to be executed on the device. A speckle image analysis module 1108 may be provided using software at memory 1116 to enable speckle images to be analyzed to compute 2D velocity vectors and/or to compute secondary speckle statistics such as speckle size or spacing. A structured light analysis module 1110 may be provided using software at memory 1116 in the case where the tracking engine is used together with a structured light system. A tracking engine 1112 may be provided using software at memory 1116 in some examples. Data store 1126 is provided and stores calibration data, speckle patterns, 3D positions, 2D velocity vectors, parameters or other data.

The computer executable instructions may be provided using any computer-readable media that is accessible by computing based device 1100. Computer-readable media may include, for example, computer storage media such as memory 1116 and communications media. Computer storage media, such as memory 1116, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1116) is shown within the computing-based device 1100 it will be appreciated that the storage may be distributed or located remotely and accessed via a network or other communication link (e.g. using communication interface 1118).

The computing-based device 1100 also comprises an input/output controller 1115 arranged to output display information to a display device 1120 which may be separate from or integral to the computing-based device 1100. The display information may provide a graphical user interface. In some examples the display device 1120 may also act as a user input device if it is a touch sensitive display device.

The input/output controller 1115 is also arranged to receive and process input from one or more devices, such as user input device 1126, sensors 1114 (e.g. speckle sensors, image capture devices, IMUs, GPS modules). The input/output controller controls laser projector(s) 1124 to emit laser illumination to generate speckle patterns and optionally also structured light. The input/output controller 1115 may also output data to devices other than the display device, e.g. a locally connected printing device.

In some examples the user input device 1126 may detect voice input, user gestures or other user actions and may provide a natural user interface (NUI). This user input may be used to operate a graphical user interface at display device 1120, to play a game, or for other purposes.

Any of the input/output controller 1115, display device 1120 and the user input device 1126 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of tracking 3D position of an object in a real-world environment comprising:
   receiving, from at least one image capture device, a plurality of images of at least one speckle pattern from at least one coherent light source and at least one structured light source illuminating the object;
   computing an estimate of 3D position of the object using at least the plurality of images based on speckle pattern;
   receiving, at a processor, information about an orientation and/or a position of the object, from at least one structured light source;
   combining the estimate of 3D position of the object with the received information.

2. A method as claimed in claim 1 wherein combining the first estimate of 3D position with the received information results in a pose of the object.

3. A method as claimed in claim 1 wherein combining the first estimate of 3D position with the received information results in an absolute 3D position of the object.

4. A method as claimed in claim 1 comprising receiving the orientation and/or position information from a sensor at the object, the sensor comprising at least one of: an inertial measurement unit, a compass, an accelerometer.

5. A method as claimed in claim 1 comprising receiving the orientation and/or position information from a fiducial marker system or a calibrated light emitting diode system.

6. A method as claimed in claim 1 the speckle pattern and structured light being emitted by a same projector.

7. A method as claimed in claim 1 wherein the received images are of a plurality of multiplexed speckle patterns.

8. A method as claimed in claim 1 wherein the at least one coherent light source illuminates the object and generates the speckle pattern by scattering from surfaces of the object.

9. A method as claimed in claim 1 comprising correcting for drift in the estimate of 3D position by using position and/or orientation data received from the at least one source.

10. A method as claimed in claim 1 comprising receiving the plurality of images from at least one image capture device worn by a user.

11. A method as claimed in claim 1 wherein the images are of a speckle pattern generated by a coherent light source worn by a user.

12. A method of tracking 3D position of an object in a real-world environment comprising:
    receiving, from at least one image capture device, a plurality of images of the object illuminated by a structured light pattern and by a coherent light source forming a speckle pattern;
    computing a first estimate of 3D position of the object on the basis of speckle information in the plurality of images;
    computing a second estimate of 3D position of the object on the basis of structured light in the plurality of images; and
    combining the first and second estimates of 3D position of the object.

13. A method as claimed in claim 12 comprising computing the first estimate of 3D position more frequently than computing the second estimate of 3D position.

14. A method as claimed in claim 12 comprising combining the first and second estimates of 3D position of the object by applying any of: a Kalman filter, a proportional integration feedback controller.

15. An apparatus comprising:
    a processor arranged to receive, from at least one image capture device, a plurality of images of at least one speckle pattern from at least one coherent light source and at least one structured light source illuminating an object in a real-world environment;
    a tracking engine arranged to compute an estimate of 3D position of the object using at least the plurality of images based on speckle pattern;

the tracking engine arranged to receive information about an orientation and/or a position of the object based on structured light; and the tracking engine arranged to transform the estimate of 3D position of the object using the received information.

16. An apparatus as claimed in claim 15 which is integral with a body worn or a hand-held device.

17. An apparatus as claimed in claim 15 wherein the tracking engine comprises a feedback mechanism selected from any of: a proportional integration feedback mechanism, a Kalman filter.

18. An apparatus as claimed in claim 15 the tracking engine being at least partially implemented using hardware logic selected from any one or more of: a field-programmable gate array, a program-specific integrated circuit, a program-specific standard product, a system-on-a-chip, a complex programmable logic device, a graphics processing unit.

19. A method as claimed in claim 12 comprising receiving the plurality of images from at least one image capture device worn by a user.

20. A method as claimed in claim 12 wherein the images are of a speckle pattern generated by a coherent light source worn by a user.

* * * * *